United States Patent [19]

Kikuchi et al.

[11] Patent Number: 5,201,116
[45] Date of Patent: Apr. 13, 1993

[54] PROCESS FOR MEASURING UNBALANCE OF TORQUE CONVERTER AND PROCESS FOR CORRECTING SUCH UNBALANCE

[75] Inventors: Tokio Kikuchi; Yasuharu Katsuno; Zenichiro Kumita; Satoru Ichihashi; Mitsunori Murakami; Toshiharu Kano; Koh Namiki, all of Saitama, Japan

[73] Assignee: Honda Giken Kogyo Kabushiki Kaisha, Tokyo, Japan

[21] Appl. No.: 689,585

[22] Filed: Apr. 23, 1991

[30] Foreign Application Priority Data

Apr. 24, 1990 [JP] Japan .................. 2-107832

[51] Int. Cl.⁵ .................. F16D 33/00; G01M 1/16; G01M 1/32
[52] U.S. Cl. .................. 29/889.5; 29/888.021; 29/889.1; 29/901; 73/468
[58] Field of Search .................. 29/407, 889.1, 889.4, 29/889.5, 901, 888, 888.02, 888.021; 73/468, 469, 470, 455, 460; 74/603, 604, 866; 123/192 B; 416/174, 180, 197

[56] References Cited

U.S. PATENT DOCUMENTS

| | | | |
|---|---|---|---|
| 2,347,071 | 4/1944 | Bailey | 29/889.5 X |
| 2,653,547 | 9/1953 | Langdon | 29/889.5 X |
| 2,660,970 | 12/1953 | Koskinen | 29/889.5 |
| 2,691,812 | 10/1954 | Misch | 29/889.5 |
| 2,752,859 | 7/1956 | Zeidler | 29/889.5 X |
| 3,681,837 | 8/1972 | Franklin | 29/889.5 |
| 3,817,088 | 6/1974 | Herbig | 73/468 X |
| 4,190,140 | 2/1980 | Konkle et al. | 29/889.5 |

FOREIGN PATENT DOCUMENTS 63-40829  2/1963  Japan .
59-65660  4/1984  Japan .

Primary Examiner—Joseph M. Gorski
Assistant Examiner—Peter Dungba Vo
Attorney, Agent, or Firm—Armstrong, Westerman, Hattori, McLeland & Naughton

[57] ABSTRACT

A process for measuring an unbalance of a torque converter, in which an outer member and an inner member of the torque converter are assembled, and oil is filled into the outer member to establish a condition similar to an actual service state of the torque converter. In this condition, the two members are rotated in unison. If the rotational speed of the torque converter reaches a measuring rotational speed, a plurality of measurements are conducted with the phase of the outer and inner members being varied between each measurement through a predetermined angle, thereby correctly detecting only an unbalance due to the outer member, with an unbalance due to the inner member being canceled from the results of the measurements. Cutting a balance weight having a weight sufficient to correct the detected unbalance from a metal tape and attached said cut balance weight to an outer periphery of the outer member of the torque converter at a given position by spot-welding or adhesive-bonding.

5 Claims, 13 Drawing Sheets 5,201,116

PROCESS FOR MEASURING UNBALANCE OF TORQUE CONVERTER AND PROCESS FOR CORRECTING SUCH UNBALANCE

BACKGROUND OF THE INVENTION

1. Field of the Invention

The field of the present invention is processes for measuring an unbalance of an outer member of a torque converter which transmits a torque from an internal combustion engine to a member to be driven, and processes for correcting such unbalance.

2. Description of the Prior Art

In the conventional measurement and correction of an unbalance of a torque converter, it is a practice to set, in a measuring device, a torque converter comprising an outer member comprised of a pump impeller and an input case, and an inner member assembled within the outer member and comprised of a turbine wheel and a stator wheel, to rotate the outer and inner members in unison to measure a total unbalance of the members, and to correct such unbalance by fixing a balance weight to a portion of the outer member on the basis of the result of the measurement (for example, see Japanese Patent Application Laid-open Nos. 65660/84 and 40829/88).

In the process for measurement of the total unbalance of the outer and inner members as in the prior art, however, it is impossible to accurately measure an unbalance of the outer member independently. This is not suitable for an actual service, because the outer and inner members are rotated independently in a state in which the torque converter is in actual service. Consequently, there is a possibility that if a balance weight for correcting the unbalance is attached to the outer member, the balanced condition may be deteriorated.

In the actual service state of the torque converter, oil is filled within the outer member, so that a torque is transmitted from the outer member to the inner member by virtue of such oil. In the above conventional unbalance measuring process, the unbalance is measured in a condition of no oil filled. For this reason, there is a possibility that if the oil is filled into the outer member in the service state, the balanced condition once reached is deteriorated again by the filled oil due to a circumferential unevenness of the shape of an inner surface of the outer member.

In addition, in the prior art, a balance weight is attached by a padding in a seam-welding and hence, not only is it possible that a casing of the torque converter may be locally heated by a seam-welding torch, so that a strain may be produced in the casing, but also it is difficult to provide a padding of a correct amount due to an instability of welding conditions. Moreover, there is also another problem that a working environment is deteriorated by a torch spark.

SUMMARY OF THE INVENTION

Accordingly, it is an object of the present invention to accurately measure an unbalance of an outer member of a torque converter and to accurately correct the measured unbalance.

To achieve the above object, according to the present invention, there is provided a process for determining an unbalance of an outer member of a torque converter by assembling an inner member within the outer member and rotating the two members in unison. The process comprises the steps of measuring a plurality of unbalance of the torque converter, wherein a phase of rotation is varied through a predetermined angle between each measurement, and calculating the unbalance due to the outer member from the measurements of said torque converter, by canceling an unbalance due to the inner member.

With the above feature, the plurality of measurements of the unbalance of the torque converter are conducted with the phase of the outer and inner members being varied between each measurement, and the unbalance due to the inner member is canceled from the plurality of the measurements. Therefore, it is possible to correctly detect only the unbalance due to the outer member.

If the process includes a step of increasing the rotational speed of the outer and inner members coupled to each other to a measuring rotational speed before the measuring step, a step of conducting a plurality of measurement at the measuring rotational speed with the phase of the outer and inner members being varied through the predetermined angle between each measurement, and a step of reducing the rotational speed of the outer and inner members from the measuring rotational speed after the measuring step, the measurements and the variation of the phases between the individual measurements are sequentially conducted with the measuring rotational speed being maintained and hence, the time required for the measurements is substantially shortened.

Further, if the measurements are conducted in a condition in which oil has been filled within the outer member, such measurements are carried out in a condition including an unbalance due to an uneven distribution of the oil within the outer member, i.e., in a condition conformed to an actual service state of the torque converter. Thus, a further accurate measurement can be achieved.

In addition, according to the present invention, there is provided a process for correcting an unbalance of a torque converter by measuring an unbalance of the torque converter and binding a balance weight to an outer periphery of the torque converter to correct such unbalance, comprising the steps of cutting a metal tape into a balance weight having a weight sufficient to correct an amount of an unbalance of the torque converter; transferring the cut balance weight to allow it to abut against the outer periphery of the torque converter at a predetermined location thereof; and binding the balance weight to the torque converter by spot-welding or adhesive-bonding.

With the above feature, the balance weight is formed by cutting the metal tape into a predetermined length and therefore, not only it is unnecessary, as was the case previously, to provide a large number of balance weights of various weights, but also it is possible to accurately adjust the weight of the balance weight. In addition, because the balance weight is bound to the torque converter by spot-welding or adhesive-bonding, it is possible to avoid any deformation of a casing of the torque converter due to the heat of conventional seam-welding.

The spot-welding can be conducted by either a laser welding device or a beam welding device.

Further, according to the present invention, there is provided a process for correcting an unbalance of a torque converter, comprising the steps of filling oil into an outer member of the torque converter comprising an inner member coupled to the outer member; measuring a plurality of unbalance of said torque converter, wherein a phase of rotation of the outer and inner members is varied through a predetermined angle between each measurement and calculating the unbalance due to the outer member and the oil therein from the measurements, by canceling an unbalance due to the inner member; cutting a metal tape into a balance weight having a sufficient weight to correct the calculated unbalance; binding the balance weight to an outer periphery of the torque converter at a predetermined location; and, discharging the oil from within the outer member.

With the above feature, the plurality of measurements on the torque converter are conducted in a state in which the phase of the outer and inner members is varied, and the unbalance due to the inner member is canceled from the plurality of measurements. Therefore, it is possible to correctly detect only the unbalance due to the outer member. In this case, because the measurements are conducted in a state in which the oil has been filled within the outer member of the torque converter., it is possible to concurrently detect the unbalance due to an uneven distribution of the oil within the outer member in addition to the unbalance due to the outer member, thereby enabling a correction of an unbalance corresponding to that in a state in which the torque converter is in the actual service. Additionally, because the balance weight is formed by cutting the metal tape into a predetermined length, not only is it unnecessary, as was the previous practice, to provide a large number of balance weights of various weights, but also it is possible to accurately adjust the weight of the balance weight.

The above and other objects, features and advantages of the invention will become apparent from a reading of the following description of the preferred embodiment, taken in conjunction with the accompanying drawings.

BRIEF DESCRIPTION OF THE DRAWINGS

FIGS. 1 to 13 illustrate one embodiment of the present invention, wherein

FIG. 1 illustrates a layout of a line for correcting an unbalance of a torque converter;

FIG. 2 is a sectional view of a structure of the torque converter;

FIG. 3 is a view illustrating an oil filing device;

FIG. 4 is a view of an unbalance measuring device;

FIG. 5 is an enlarged perspective view of a drive shaft;

FIG. 6 illustrates a torque converter with the drive shaft inserted thereinto;

FIG. 7 is a perspective view of a balance weight feeding mechanism;

FIG. 8 is a plan view of the entire balance weight binding mechanism;

FIG. 9 is a sectional view taken along a line IX—IX in FIG. 8;

FIG. 10 is a sectional view taken along a line X—X in FIG. 8;

FIG. 11 is a view illustrating an oil discharging device;

FIG. 12 is a graph for explaining the operation of an unbalance measuring step;

FIG. 13 is a diagram for explaining the contents of a calculation.

DESCRIPTION OF THE PREFERRED EMBODIMENT

The present invention will now be described by way of one embodiment in connection with the accompanying drawings.

Figure 1:
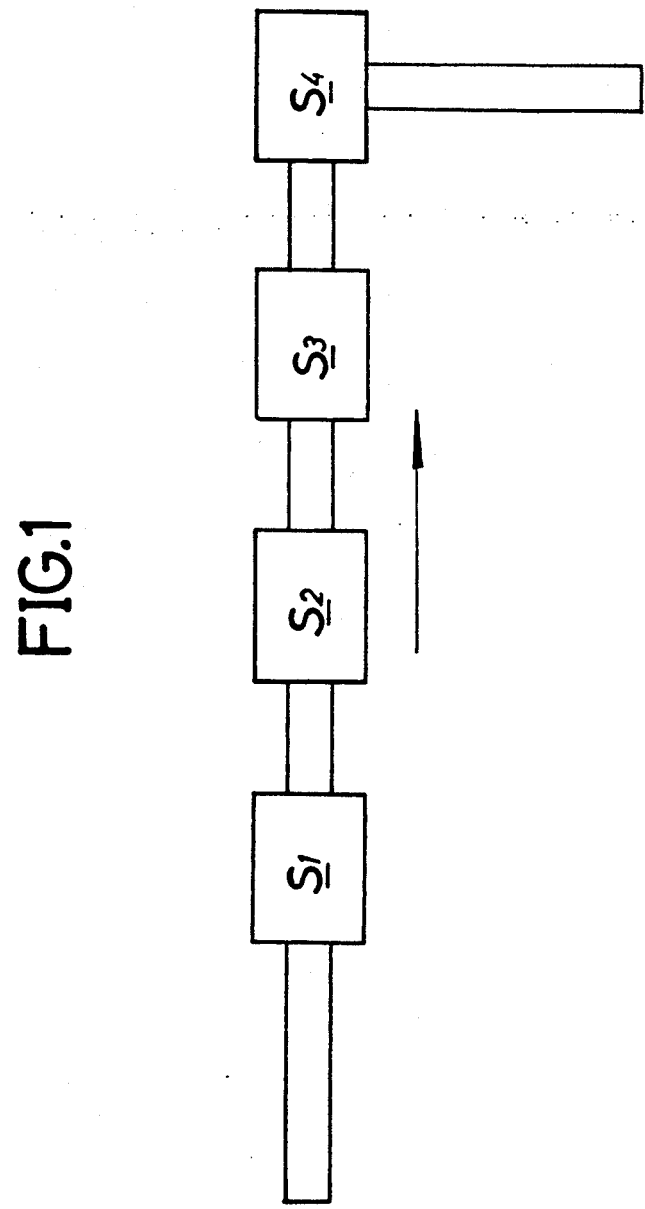

FIG. 1 illustrates a layout of an unbalance correcting line for a torque converter. The unbalance correcting line comprises an oil filling station $S_1$, an unbalance measuring station $S_2$, a balance Weight binding station $S_3$, and an oil discharging station $S_4$.

Figure 2:
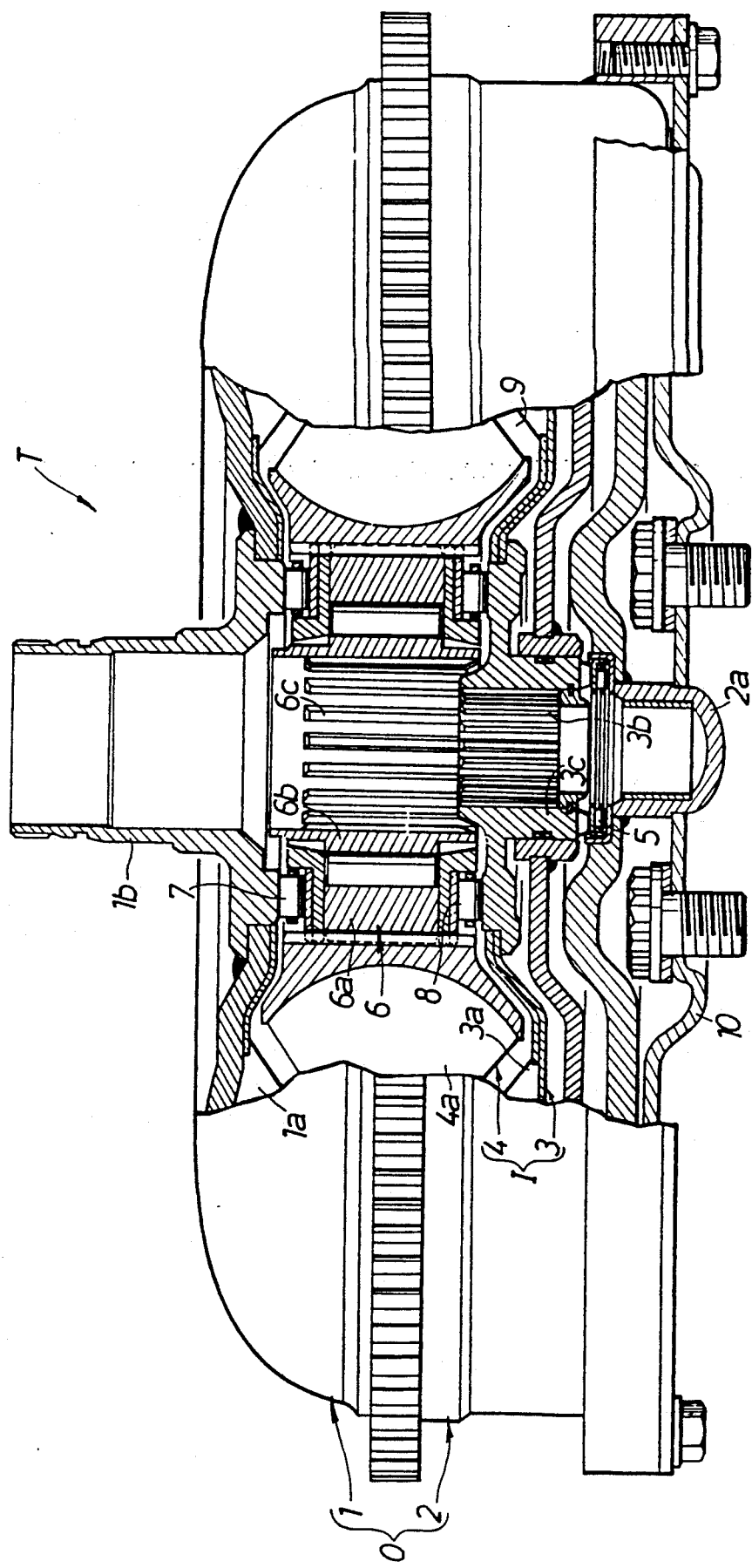

FIG. 2 is a sectional view illustrating a structure of a torque converter. This torque converter T comprises a bowl-like pump impeller 1 having a plurality of blades 1a formed on an inner surface thereof, and a bowl-like input case 2 integrally coupled to the pump impeller 1 to form an outer shell of the torque converter T. Disposed within the pump impeller 1 and the input case 2 are a turbine wheel 3 and a stator wheel 4. The turbine wheel 3 has a large number of blades 3a. The stator wheel 4, having a large number of blades 4a, is disposed between the pump impeller 1 and the turbine wheel 3 so as to form a wheel chamber 9 in cooperation with the pump impeller and the turbine wheel 3. The pump impeller 1 and the input case 2 constitute an outer member O providing the outer shell of the torque converter T. The turbine wheel 3 and the stator wheel 4 are contained within the outer member O to form an inner member I which is rotatable relative to the outer member O.

A cylindrical portion 1b is provided at a central portion of the pump impeller 1 coaxially with the axis of rotation of the pump impeller 1 to extend in an axially (upward as viewed in FIG. 2) direction. A bag-like bearing portion 2a is provided at a central portion of the input case 2 for rotatably supporting an end of an output shaft (not shown). The output shaft is inserted into the torque converter T and corrected to the turbine wheel 3 and the stator wheel 4.

The turbine wheel 3 includes, at a central portion, a cylindrical output portion 3c which has a spline 3b formed therein for spline-connection to the output shaft and which is supported on or in the vicinity of the central portion of the input case 2 through a thrust bearing 5. The stator wheel 4 has a one-way clutch 6 at a radially inner end thereof. A thrust bearing 7 is interposed between an outer wheel portion 6a of the one-way clutch 6 and the pump impeller 1, and a thrust bearing 8 is interposed between the outer wheel portion 6a and the turbine wheel 3. A spline 6c is formed in an inner wheel portion 6b of the one-way clutch 6 for spline-connection to the output shaft. A drive plate 10 is mounted on the input case 2 and is connected to an engine to rotatably drive the outer member O of the torque converter T.

Figure 3:
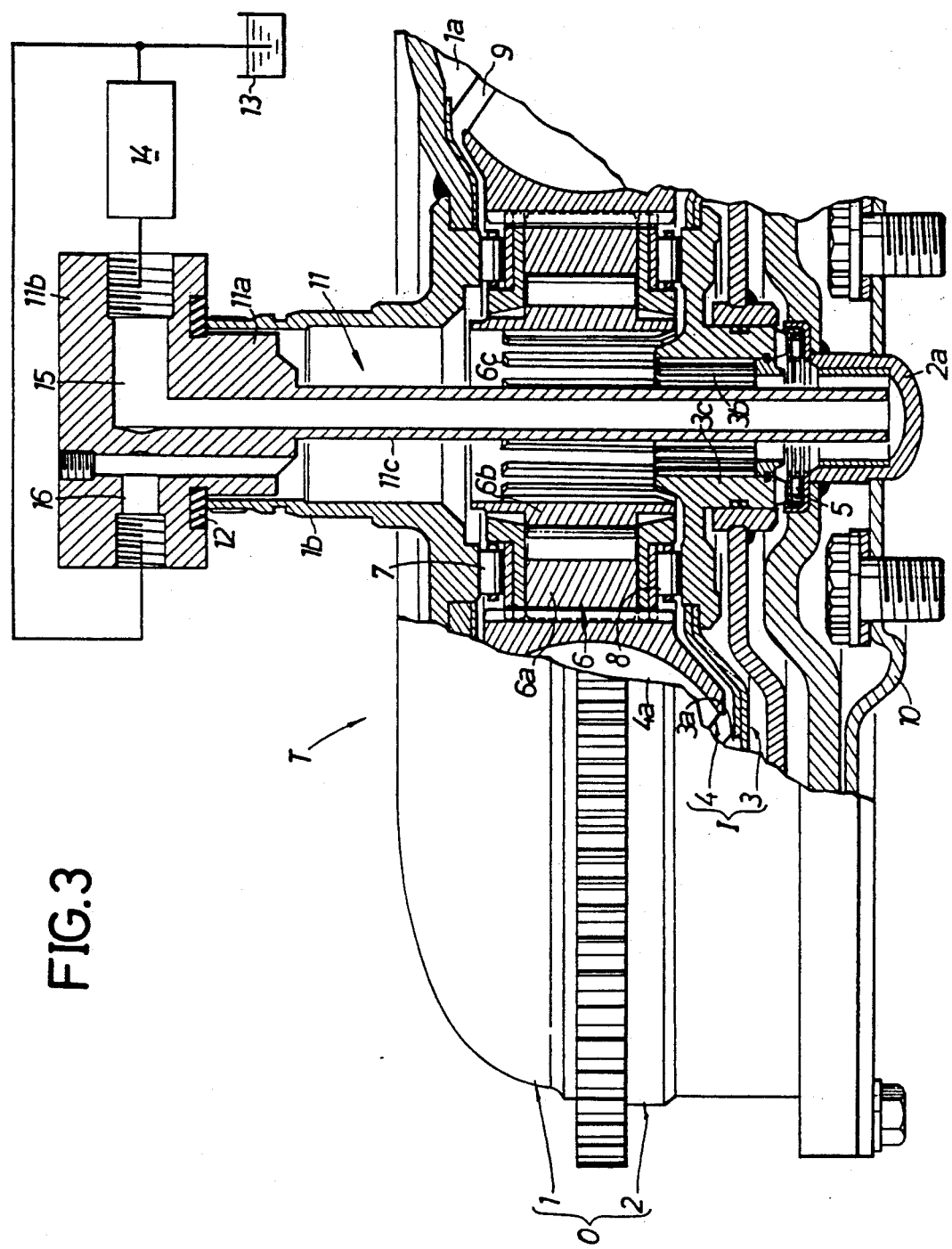

FIG. 3 illustrates an oil filling device in an oil filling station $S_1$. The oil filling device comprises an insertion unit 11 which can be inserted through the cylindrical portion 1b of the pump impeller 1 into the torque converter T.

The insertion unit 11 comprises a columnar portion 11a fitted in the cylindrical portion 1b of the pump impeller 1 with a slight gap left therebetween, a flange portion 11b projecting radially outwardly at the top end of the columnar portion 11a, and an oil supply pipe 11c coaxially provided on the lower portion of the columnar portion 11a to extend through the center of the torque converter T to the bag-like bearing portion 2a at the lower end of the input case 2. With the insertion unit 11 inserted into the torque converter T, an opening of the cylindrical portion 1b is sealed by a sealing member 12 mounted in the flange portion 11b of the insertion unit and the wheel chamber 9 in the torque converter T is out of communication with the atmosphere.

An oil tank 13 is connected to the insertion unit 11 through an oil supply pump 14. The oil tank 13 stores oil which is filled into the wheel chamber 9. The oil tank 13 communicates with the upper end of the oil supply pipe 11c through a first passage 15 provided in the flange portion 11b of the insertion unit 11. A second passage 16 is also provided in the flange portion 11b of the insertion unit 11 to discharge air and surplus oil within the torque converter T and is connected to the oil tank 13 through an oil passage.

Figure 4:
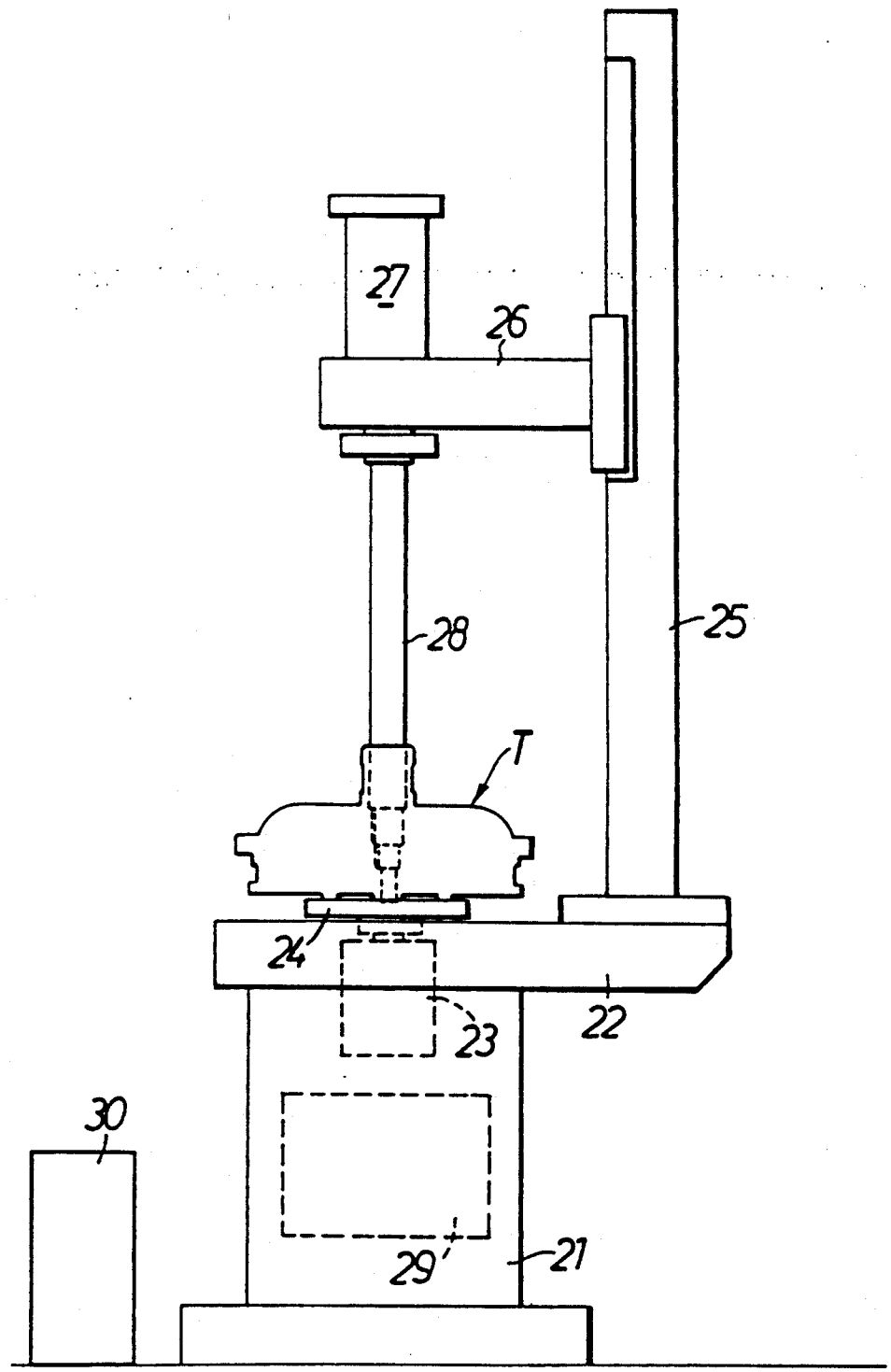

FIG. 4 illustrates a structure of an unbalance measuring device in the unbalance measuring station $S_2$. A turn table 24 is mounted on the upper surface of a measuring stand 22 horizontally supported on a base 21 and is adapted to be rotated by a first drive motor 23. The input case 2 of the torque converter T is supported on the turn table 24 with its axial center aligned with the axis of rotation of the turn table 24.

A lift arm 26 is slidably supported on a support post 25 at the side of the measuring stand 22 and is connected to a drive source (not shown) for vertical movement. A second drive motor 27 is mounted on the tip end of the lift arm 26. A drive shaft 28 is attached to an output shaft of the second drive motor. The drive shaft 28 is disposed coaxially with the axis of rotation of the turn table 24 and inserted form above into the cylindrical portion 1b formed at the center of the pump impeller 1 of the torque converter T.

Figure 5:
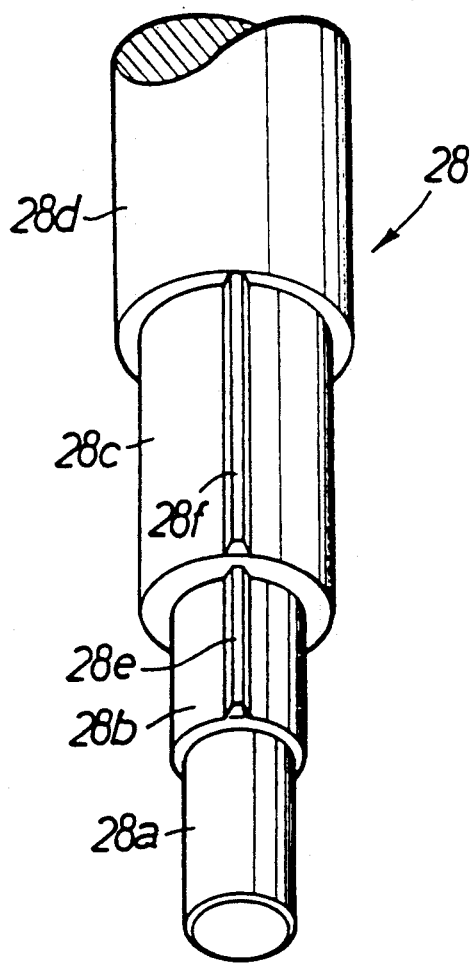
Figure 6:
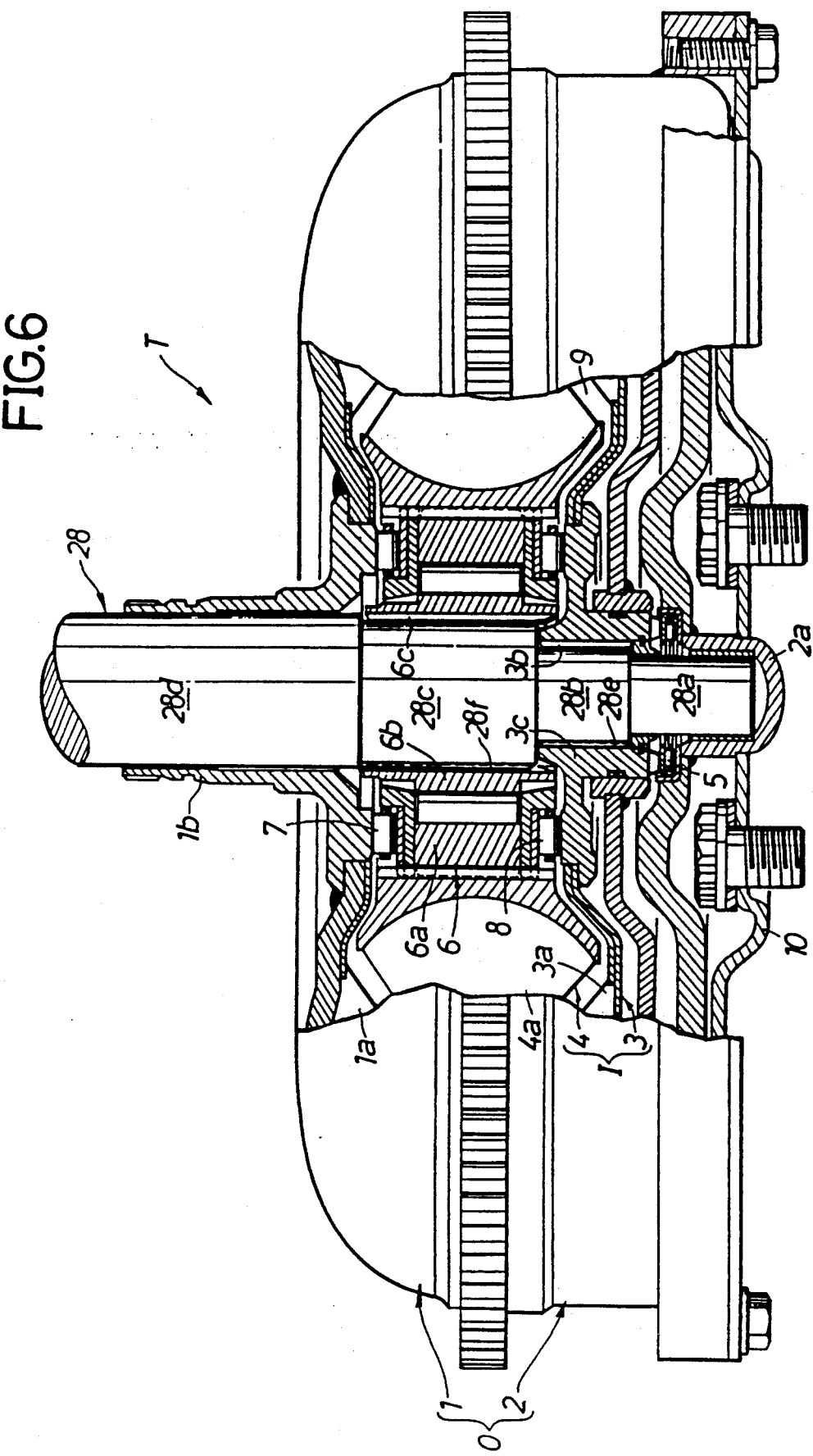

As apparent from FIGS. 5 and 6, the drive shaft 28 comprises, in sequence form the lower end, a first stepped portion 28a fitted into the bag-like bearing portion 2a, a second stepped portion 28b fitted into the output portion 3c of the turbine wheel 3, a third stepped portion 28c fitted into the inner wheel portion 6b of the one-way clutch 6, and a shank portion 28d fitted into the cylindrical portion 2b of the pump impeller 1. The second stepped portion 28b of the drive shaft 28 is provided with a key 28e which is engageable in the spline 3b provided in the output portion 3c of the turbine wheel 3. The third stepped portion 28c is provided with a key 28f which is engageable in the spline 6c provided in the inner wheel portion 6b of the one-way clutch 6. Therefore, the drive shaft 28 inserted into the torque converter T is relatively rotatable with respect to the pump impeller 1 and the input case 2 which constitute the outer member O, and is rotatable together with the turbine wheel 3 and the stator wheel 4 constituting the inner member I.

A measuring device 29 is disposed within the base 21 for measuring the unbalance of the torque converter T. This measuring device 29 and the first and second drive motor 23 and 27 are connected to a controller 30 including a microcomputer. The first drive motor 23 and the second drive motor 27 are normally driven at the same rotational speed synchronously with each other and controlled in the course of measurement in such a manner that the phase of the second drive motor 27 is displaced by 180° relative to the phase of the first drive motor 23.

FIGS. 7 to 10 illustrate structures of a balance weight supplying mechanism 31 and a balance weight binding mechanism 49 mounted in the balance weight binding station $S_3$. As can be seen from FIG. 7, the balance weight supplying mechanism 31 cuts a metal tape 33 wound around a reel 32 into a predetermined length to provide a balance weight 34 which is welded on an outer periphery of the torque converter T. The balance weight supplying mechanism 31 comprises a mechanism for feeding the metal tape 33 and a mechanism for cutting the metal tape 33.

The mechanism for feeding the metal tape 33 includes an L-shaped drive plate 38 supported on a rack 37. The rack 37 is meshed with a pinion 36 to be moved reciprocally. The pinion 36 is rotatably driven by a supplying servo-motor 35. An urging cylinder 40 is supported above the drive plate 38 through a bracket 39. An urging plate 41 is provided on the urging cylinder 40 for vertical movement, in order to clamp the metal tape 33 between the urging plate 41 and the drive plate 38. The reel 32 is mounted around an output-shaft of an unloosing motor 42 to sequentially feed the metal tape 33. A limit switch 43 is provided above the metal tape 33 fed from the reel 32 for detecting the tension of the metal tape 33 to control the operation of the unloosing motor 42.

The mechanism for cutting the metal tape 33 comprises a cutting stand 44 mounted adjacent a moving end of the drive plate 38, a clamping cylinder 46 for driving a clamp member 45 which fixes a leading end of the metal tape 33 onto the cutting stand 44, and a cutting cylinder 48 for driving a cutter 47 which cuts the fixed metal tape 33 in cooperation with the cutting stand 44. Thus, the leading end of the metal tape 33 fed is cut by the cutter 47 in a state grasped by a pair of chuck pawls 68 which will be described hereinafter, thereby providing a balance weight 34 of a predetermined length.

Figure 8:
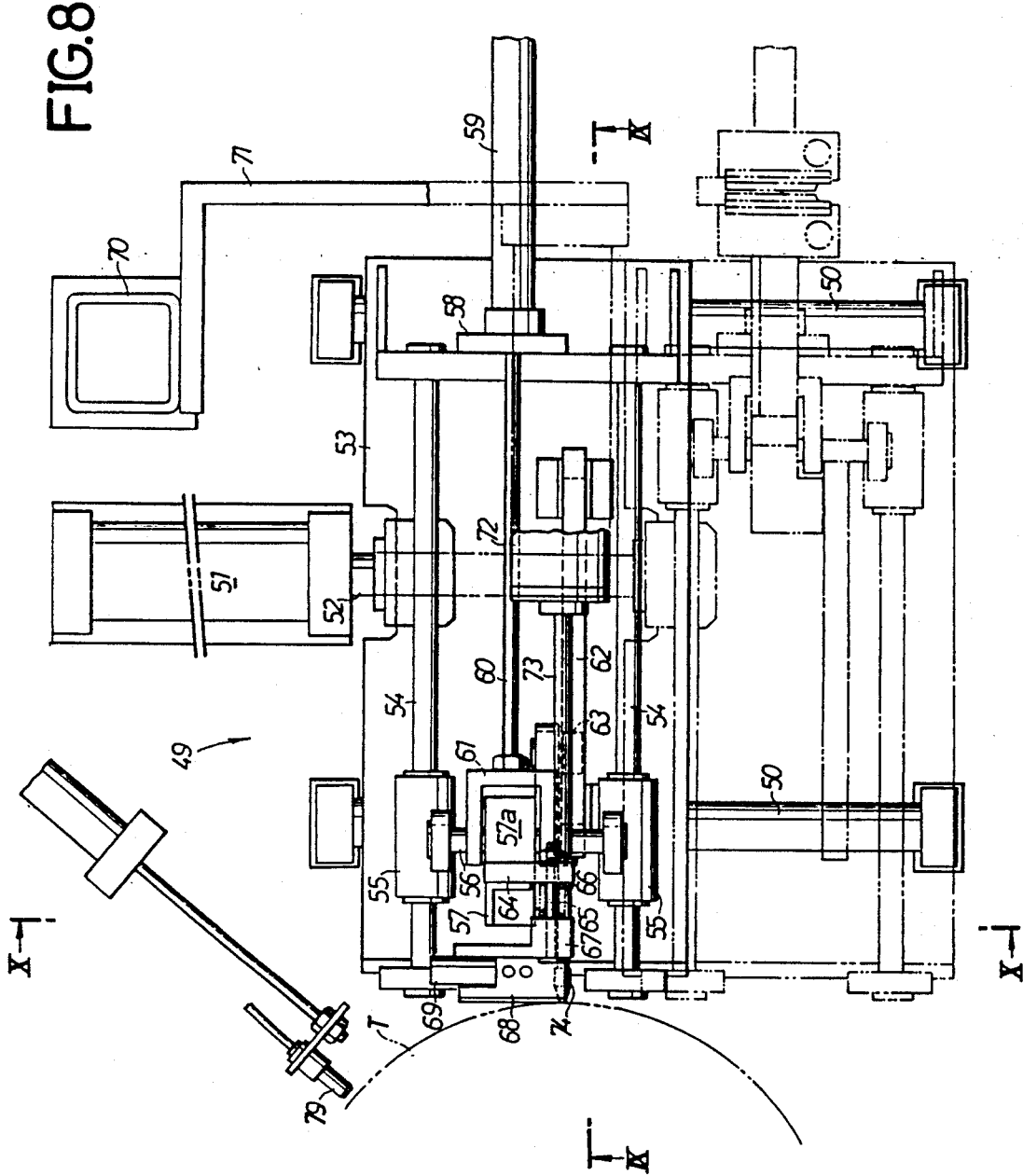
Figure 9:
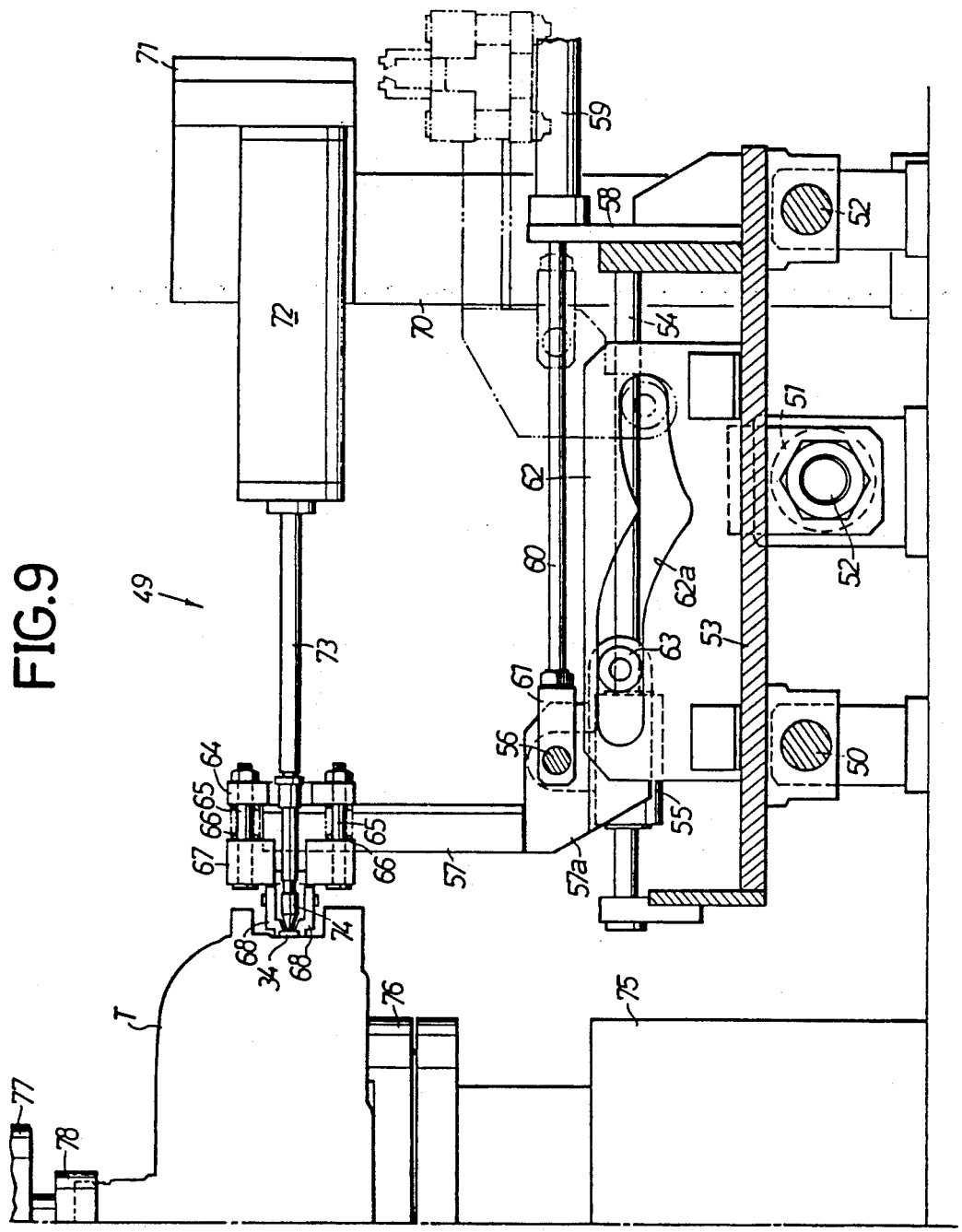
Figure 10:
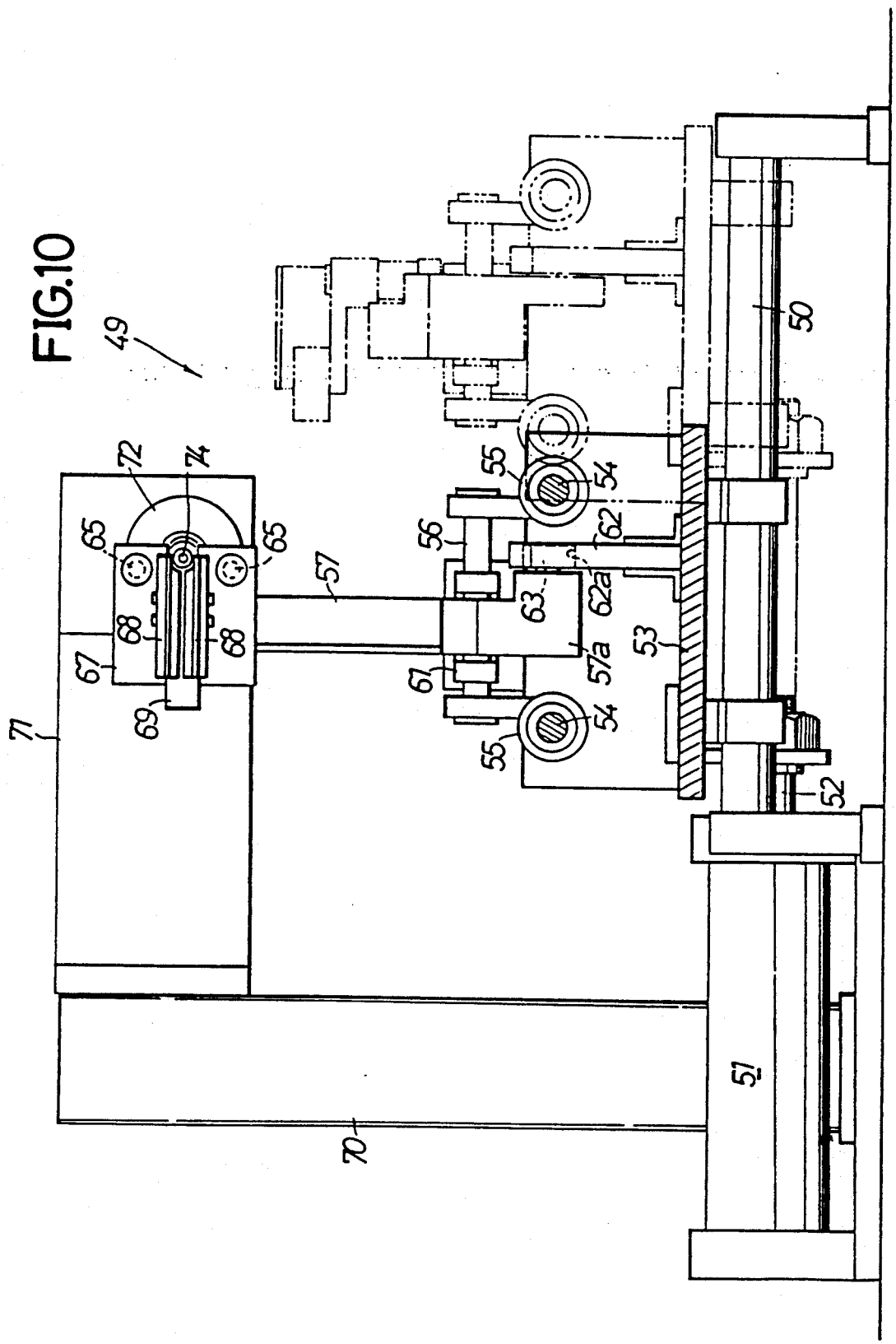

It can be seen from FIGS. 8 to 10 that the balance weight binding mechanism 49 is comprised of a balance weight transporting mechanism, a welding mechanism for spot-welding the transported balance weight 34 on the outer periphery of the torque converter T, and a rotating mechanism for supporting and rotating the torque converter T.

The mechanism for transporting the balance weight 34 includes a base 53 which is slidably supported on two guide rods 50. The base 53 is connected to a piston rod 52 of a moving cylinder 51 for reciprocal movement in a direction parallel to a direction of feeding the metal tape 33. Two guide rods 54 are disposed in a direction perpendicular to the guide rod 50 and supported on an upper surface of the base 53. Sliders 55 are slidably supported on the guide rods 54 respectively and interconnected by a connecting rod 56. A base block 57a of a swingable arm 57 is rotatably supported on an intermediate portion of the connecting rod 56. A U-shaped knuckle 61 is mounted at the tip end of a piston rod 60 of swinging cylinder 59 supported on the base 53 through a bracket 58. The knuckle 61 is also connected to the intermediate portion of the connecting rod 56. A cam plate 62 is secured to an upper surface of the base 53 in parallel with the guide rod 54. A roller 63 is provided on a side of the lower portion of the base block 57a to engage a cam groove 62a made in the cam plate 62. Thus, if the base block 57a is retreated along the guide rods 54 by contracting the swinging cylinder 59, the roller 63 is guided in the cam groove 62a of the cam plate 62, and the swingable arm 57 is tilted down to a horizontal position shown by a dashed line together with the base block 57a. If the swinging cylinder 50 is expanded, the swingable arm 57 is righted to a vertical position shown by a solid line while being moved forwardly.

A stationary plate 64 is secured to the tip end of the swingable arm 57. A movable plate 67 is slidably supported on two guide pins 65 embedded in a front surface of the stationary plate 64 and is biased by a spring 66. A chuck cylinder 69 is mounted on a front surface of the movable plate 67 and includes a pair of chuck pawls 68 capable of opening and closing to grasp the balance weight 34 cut from the metal tape 33. Thus, when the swingable arm 57 is in its tilted-down position shown by a dashed line, the tip end of the metal tape 33 is placed between the pair of chuck pawls 68 to be grasped and cut by the cutter 47 (see FIG. 7). The chuck pawls 68 grasping the balance weight 34 cut from the metal tape 33, is moved horizontally together with the base 53, at the same time, the swingable arm 57 is righted on the base 53 to its position shown by the solid line, thereby causing the balance weight 34 grasped by the chuck pawls 68 to abut against the side surface of the torque converter T supported on the rotating mechanism which will be described hereinafter. At this time, the chuck pawls 68 are slightly retreated by compression of the spring 66, so that the balance weight 34 is urged against the side of the torque converter T under a predetermined pressure.

The welding mechanism includes a welding cylinder 72 which is supported on the upper end of the support post 70 through a bracket 71. A laser- or beam-welding tip 74 is mounted on the tip end of the piston rod 73. Thus, when the swingable arm 57 is righted to the position shown by the solid line, the welding tip 74 is allowed to abut against the side surface of the balance weight 34 grasped by the chuck pawls 68 by expansion of the welding cylinder 72.

The rotating mechanism comprises a turn table 76 provided on the base 75 for rotatably bearing the torque converter T thereon. A rotating servo motor 77 is liftably mounted above the turn table 76. A drive member 78, engageable with a center of the torque convert T, is mounted at the lower end of an output shaft of the servo motor 77. A detector 79 is provided in the vicinity of the turn table 76 for detecting the rotational position of the torque converter T.

Figure 11:
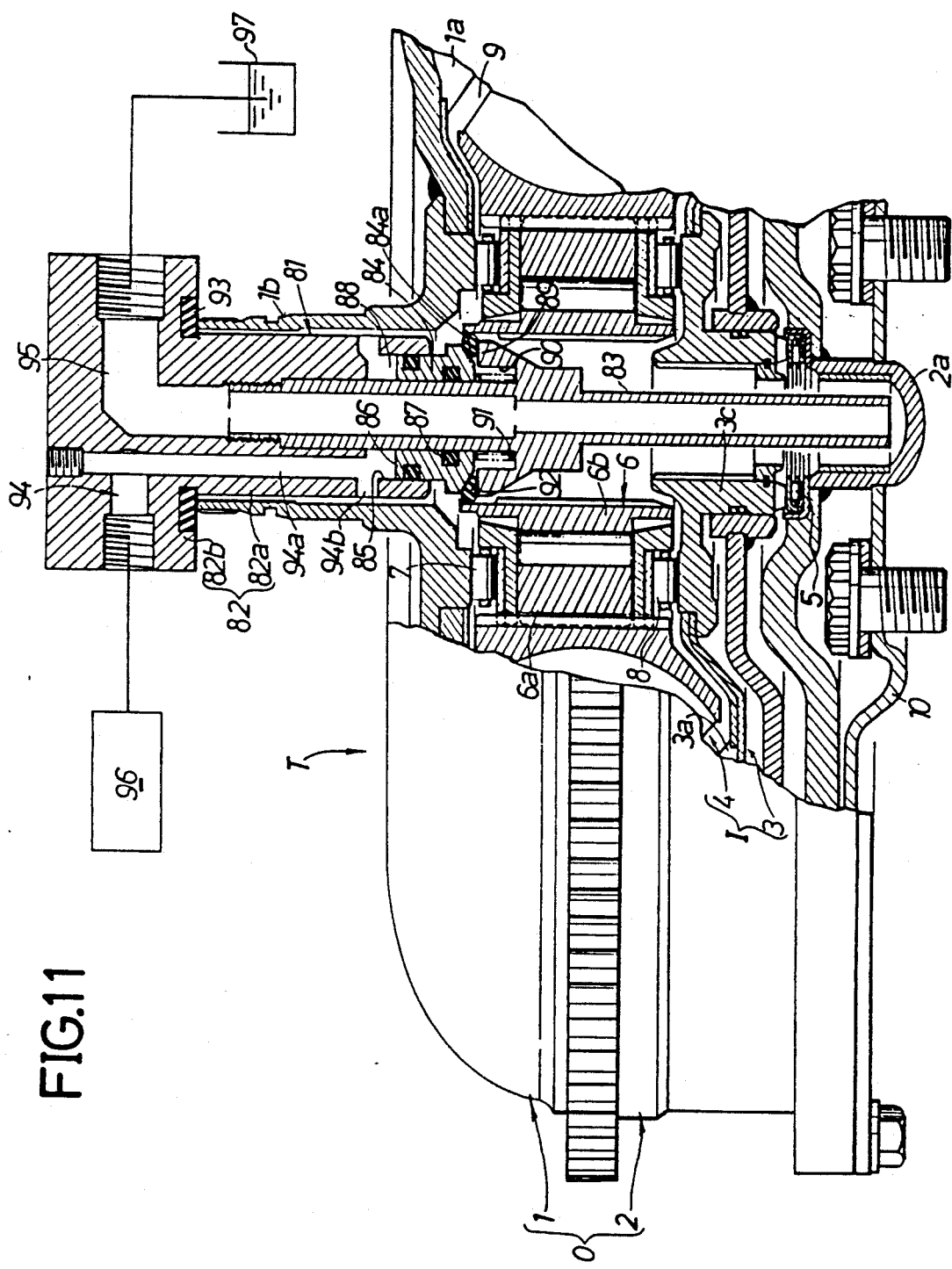

FIG. 11 illustrates an oil discharging device in the oil discharging station S4. The oil discharging device comprises an insertion unit 81 which is capable of inserting into and withdrawing from the torque converter T through the cylindrical portion 1b on the pump impeller 1.

The insertion unit 81 comprises a unit body 82 comprised of a radially outwardly projecting flange portion 82b integrally provided at one end of the columnar portion 82a, an oil discharge pipe 83 coaxially connected to the other end of the columnar portion 82a, and a piston 84 slidably fitted into the other end of the columnar portion 82a and over the oil discharge pipe 83.

The columnar portion 82a, in the unit body 82, is formed into a columnar shape with such an outside diameter that it can be inserted into the cylindrical portion 1b of the pump impeller 1. A recess 85, having a circular cross-section, is coaxially provided in the other end of the columnar portion 82a. A diameter of the oil discharge pipe 83 is made smaller than that of the columnar portion 82a and coaxially connected to the other end of the columnar portion 82a by threaded engagement in the closed end of the recess 85. The piston 84 is slidably fitted in the columnar portion 82a and over the oil discharge pipe 83 with an O-ring 86 interposed between the piston 84 and an inner surface of the recess 85 and with an O-ring 87 interposed between the piston 84 and an outer surface of the oil discharge pipe 83. An annular pressure chamber 88 is defined between the closed end of the recess 85 and the piston 84.

An annular receiving portion 89 is integrally provided at an intermediate portion of the oil discharge pipe 83 in an opposed relation to the piston 84. The receiving portion 89 projects radially outwardly and defines an annular groove 90 between the receiving portion 89, itself, and the outer surface of the oil discharge pipe 83. A spring 91 is mounted between the piston 84 and the closed end of the annular groove 90 to exhibit a spring force for biasing the piston 84 in a direction to reduce the volume of the pressure chamber 88.

The piston 84 has a tapered surface 84a which is provided at the outer peripheral edge of its surface opposed to the receiving portion 89 and which is reduced in diameter toward the receiving portion 89. A first annular sealing member 92 is clamped between the tapered surface 84a and the receiving portion 89. A second annular sealing member 93 is fitted in a base portion of the flange 82b of the unit body 82 to abut against the outer end of the cylindrical portion 1b of the pump impeller 1.

The length of the columnar portion 82a and the position of the receiving portion 89 are determined in such a manner that the first sealing member 92 contacts with the inner surface of the inner wheel portion 6b of the one-way clutch 6 in a condition in which the insertion unit 81 has been inserted into the torque converter T until the second sealing member 93 has abutted against the outer end of the cylindrical portion 1b.

The unit body 82 is provided with a passage 94a with one end opened into an outer surface of the flange portion 82b and the other end communicating with the pressure chamber 88, and a plurality of through holes 94b opened into an outer surface of the columnar portion 82a and communicating with the pressure chamber 88, thereby providing a first passageway 94 extending through the passage 94a via the pressure chamber 88 into each of the through holes 94b. The unit body 82 and the oil discharge pipe 83 are provided with a second passageway 95 with one end opened into the outer surface of the flange portion 82b and the other end opened into the leading end of the oil discharge pipe 83.

A pressurized air supply means 96, such as a compressor for supplying a pressurized gas or pressurized air, is connected to the first passageway 94, and an oil tank 97 is connected to the second passageway 95.

Description will now be made of the operation of the embodiment of the present invention having the above-described construction.

First, the torque converter T constructed with the turbine wheel 3 and the stator wheel 4 constituting the inner member I integrally assembled within the pump impeller 1 and the input case 2, constituting the outer member O, is transported into the oil filling station S1 where the insertion unit 11 is inserted into the cylindrical portion 1b of the pump impeller I constituting the outer member O (see FIG. 3). This permits the first passage 15 to communicate with the wheel chamber 9, through the oil supply pipe 11c and the thrust bearing 6, and permits the second passage 16 to communicate with the wheel chamber 9 through the thrust bearing 7. If the oil supply pump 14 is driven from this state, oil in the oil tank 13 is supplied through the first passage 15 in the insertion unit 11 and the oil supply pipe 11c into the bottom of the wheel chamber 9 in the torque converter T. Thus, as the oil level in the wheel chamber 9 is gradually rising, the air in the wheel chamber 9 is discharged through the second passage 16. When the wheel chamber is ultimately filled up with the oil, surplus oil is returned through the second passage 16 to the oil tank 13.

If the torque converter T, filled with the oil in the above-described manner, is set on the turn table 24 of the measuring device 29 in the next unbalance measuring station $S_2$, the lift arm 26 is lowered, so that the key 28e formed on the second stepped portion 28b thereof is engaged into the spline 3b of the output portion 3c of the turbine wheel 3, while the key 28f formed on the third stepped portion 28c is engaged into the spline 6c of the inner wheel portion 6b of the one-way clutch 6 (see FIG. 6).

Figure 12:
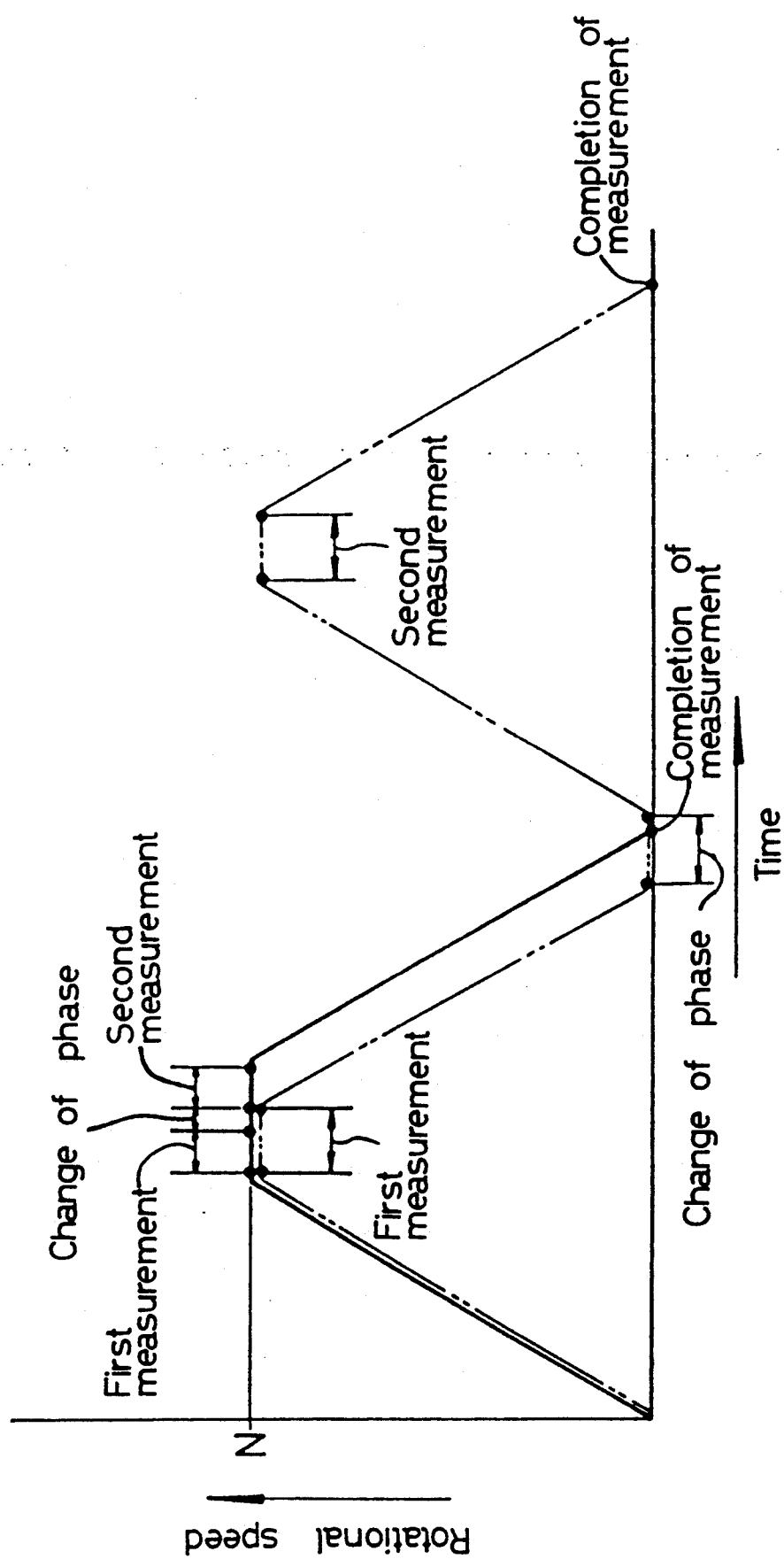

If the first drive motor 23 and the second drive motor 27 are started from this state, the turn table 24 and the drive shaft 28 are started to be rotated synchronously in unison with each other, while the rotational speed of the torque converter T is gradually increased. If the rotation of the torque converter T reaches a measuring rotational speed N, as shown by a solid line in FIG. 12, the measuring device 29 is operated to conduct a first measurement of unbalance. The result of the measurement in the form of vector is stored in the controller 30. After the first measurement is completed, the rotational speed of the second drive motor 27 is slightly increased or reduced relative to the rotational speed of the first drive motor 23, so that the phase of the outer member O supported on the turn table 24 and the inner member I supported on the drive shaft 28 is displaced through 180°, as compared with the position during the first measurement. When the phase of the outer member O and the inner member I is displaced through 180° in the above manner, the rotational speeds of the first drive motor 23 and the second drive motor 27 are synchronized again, so that the outer and inner members 0 and I are rotated in unison with each other while maintaining the displacement of the phase by 180°. Then, the measuring device 29 is operated to effect a second measurement of unbalance. The result of the measurement in the form of vector is likewise stored in the controller 30. If the second measurement is completed, the first drive motor 23 and the second drive motor 27 are reduced in speed and stopped. The unbalance of the outer member O is then found in the controller 30 by calculating vectors on the basis of the result of the two measurements as described below.

Figure 13:
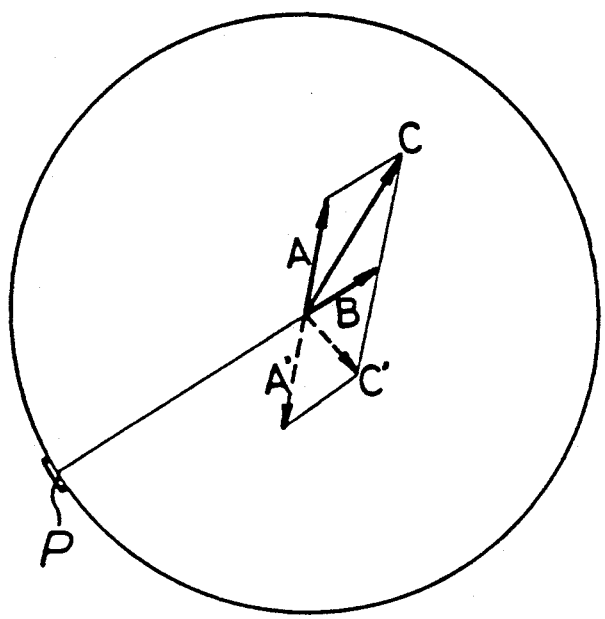

It can be seen from FIG. 13 that a vector C indicative of the unbalance of the entire torque converter T detected by the first measurement is represented as a sum of a vector A indicative of an unbalance due to the inner member I and a vector B indicative of an unbalance due to the outer member O (including an unbalance due to the oil filled in the outer member O). In addition, a vector C' of the entire torque converter T detected by the second measurement is represented as a sum of a vector A' indicative of an unbalance due to the inner member I and a vector B indicative of an unbalance due to the outer member O.

In this case, vectors A and A', due to the inner member I with the phase displaced through 180° in the first and second measurements, are equal in absolute value to each other but opposite in direction from each other, whereas the vectors B due to the outer member O in the first and second measurements are equal in both of absolute value and direction to each other. Therefore, if the results of the first and second measurements are added, the following expression is established:

$$\begin{array}{r}A + B = C \\ +) \; A' + B = C' \\ \hline 2B = C + C'\end{array}$$

the unbalance A and A', due to the inner member I, are canceled and the unbalance B due to the outer member O is found by the following expression:

$$B = (C+C')/2$$

If the vector B, corresponding to the unbalance due to the outer member O, is detected, a balance weight having a weight corresponding to the absolute value of such unbalance is fixed at a position P on an extension line of the vector B, so that the unbalance of the outer member is corrected. This correction concurrently results in correction of the unbalance due to the oil filled in the outer member O. Therefore, it is possible to provide an optimal balance suitable for the actual service state of the torque converter T. The two measurements are completed while the torque converter T is being maintained at the measuring rotational speed N. Hence, it is possible to substantially shorten the time required for such measurement (see a dashed line in FIG. 12), as compared with the case where, after completion of the first measurement, the rotation of the torque converter T is stopped, and the phase of the inner member I is varied, following which the torque converter T is rotated again, and the second measurement is carried out.

Figure 7:
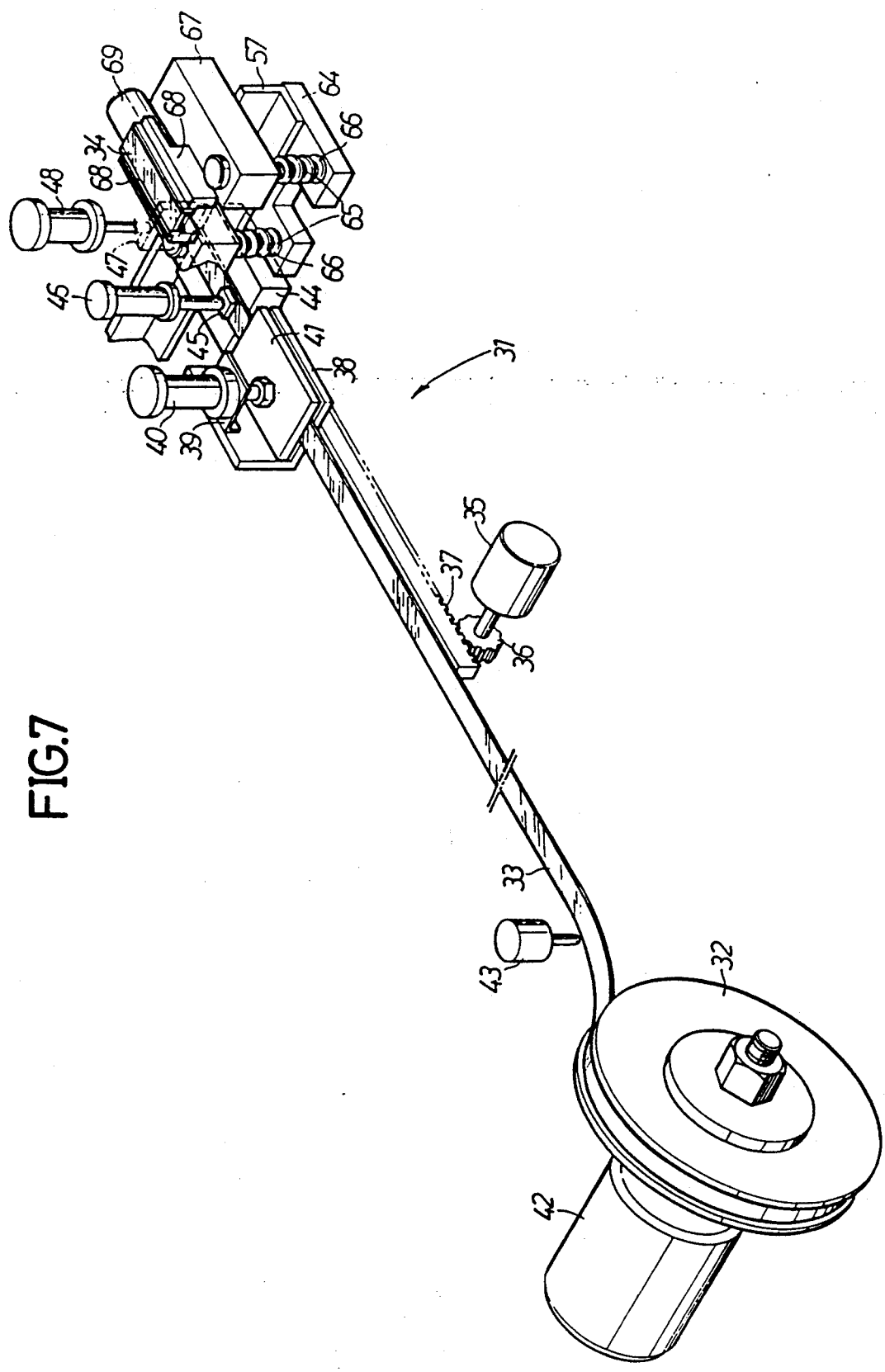

Then, if the feeding servo motor 35 is driven in a predetermined amount in accordance with an unbalance amount of the torque converter T detected in the last step in a condition in which after transporting of the unbalance-measured torque converter T into the balance weight binding station $S_3$, the urging cylinder 40 of the balance weight supplying mechanism 31 is expanded to clamp the metal tape 33 between the urging plate 41 and the drive plate 38 as shown in FIG. 7, the drive plate 38 is advanced through the pinion 36 and the rack 37, causing the leading end of the metal tape 33 to be inserted to between the chuck pawls 68 mounted at the tip end of the swingable arm 57 which is in the horizontal position. Subsequently, the chuck cylinder 69 is driven to grasp the leading end of the metal tape 33 by the chuck pawls 68, and the clamping cylinder 46 is expanded to fix the metal tape 33 onto the cutting stand 44 by the clamp member 45. Then, the cutting cylinder 48 is driven to cut the metal tape 33 by the cutter 47, thereby cutting off a balance weight 34 of a predetermined length grasped by the chuck pawls 68 from the metal tape 33. At this time, if the metal tape 33 is drawn out by the feeding servo motor 35, so that a tension is applied to such metal tape, the limit switch 43 is operated to rotate the unloosing motor 42, thereby driving the reel 32 to compensate for the drawn-out metal tape 33.

If the balance weight 34 is grasped by the chuck pawls 68 in the above-described manner, the moving cylinder 51 of the balance weight binding mechanism 49 is contracted to move the base 53 along the guide rods 54, while at the same time, the swinging cylinder 59 is expanded to swing the swingable arm 57 from the tilted-down position to the righted position. This causes the balance weight 34, grasped by the chuck pawls 68, to abut against the side of the torque converter T supported on the turn table 76.

Subsequently, the rotating servo motor 77 is operated to rotate the turn table 76 to a predetermined position, while detecting the rotational angle by the detector 79 to locate the balance weight 34 at a predetermined position on the outer periphery of the torque converter T. Then, the welding cylinder 72 is expanded, causing the welding tip 74, mounted at the tip end of the piston rod 73, to be inserted to between the pair of the chuck pawls 68, thus effecting a spot-welding of the balance weight 34 grasped by the chuck pawls 68 to the outer periphery of the torque converter T. In this case, with a balance weight 34 having a smaller length, it may be spot-welded at only one point, but with a balance weight 34 having a larger length, it may be spot-welded at a plurality of lengthwise points thereof while the torque converter T is being rotated by driving the rotating servo motor 77.

If the balance weight 34 is welded to the torque converter T in the above-described manner, the welding tip 74 is retreated to the original position to receive a balance weight 34 to be welded to a torque converter T which is subsequently transported onto the turn table 76. Then, the base 53 is returned to the original position and the swingable arm 57 is swung to the tilted-down position, thus completing one cycle.

Then, the torque converter T is transported into the oil discharging station S4 where the oil filled therein is discharged. More specifically, the insertion unit 81 is first inserted into the torque converter T through the cylindrical portion 1b until the second sealing member 93 thereof abuts against the outer end of the cylindrical portion 1b, as shown in FIG. 11. In this case, the first sealing member 92 is inserted to a position corresponding to the inner surface of the inner wheel portion 6b of the one-way clutch 6 in the torque converter T. However, the first sealing member 92 cannot strongly abut against the inner surface of the inner wheel portion 6b, because the piston 84 is biased away from the receiving portion 89 by the spring 91. Thus, it is possible to insert the insertion unit 81 into the torque converter T with a relatively small force without any large frictional force acting between the first sealing member 92 and the inner wheel portion 6b during insertion.

In such a condition of the insertion unit inserted into the torque converter T, the first passageway 94 communicates with the wheel chamber 9 via the thrust bearing 7, and the second passageway 95 communicates with the wheel chamber 9 via the thrust bearing 8.

If the pressurized gas, e.g., a pressurized air is supplied from the pressurized gas supply means 96 into the first passageway 94 in a condition of the second sealing member 93 strongly urged against the outer end of the cylindrical portion 1b, the piston 84, in response to application of a pressure to the pressure chamber 88, is urged toward the receiving portion 89, so that the first sealing member 92 is clamped between the tapered surface 84a and the receiving portion 89 and expanded by radially outward pushing-out thereof by the tapered surface 84a. Thus, the first sealing member 92 is allowed to strongly abut against the inner surface of the inner wheel portion 6b of the one-way clutch 6, thereby causing the communication between the pump impeller 1 and the stator 4 and thus between the thrust bearing 7 and the thrust bearing 8 provided between the turbine wheel 3 and the stator wheel 4 to be cut off by the sealing member 92. In addition, the second sealing member 93 strongly urged against the outer end of the cylindrical portion 1b causes a space defined between the pump impeller 1 and the stator wheel 4 to be intercepted from the outside air. This result in a flow path established to extend from the first passageway 94 via the thrust bearing 7, the wheel chamber 9 and the thrust bearing 8 to the second passageway 95.

If the supplying of the pressurized air from the pressurized gas supply means 96 is continued in such condition, the pressurized air flows through the first passageway 94 into the wheel chamber 9 to force the oil in the wheel chamber 9 downwardly, so that the oil expelled out of the wheel chamber 9 is discharged through the second passageway 95 into the discharge tank 97.

Although the embodiment of the present invention has been described above, it will be understood that the present invention is not limited thereto, and various modifications therein can be made without departing from the scope of the present invention defined in the claims.

For example, although two measurements have been conducted with the phase of the outer and inner members 0 and I varied by 18020 in the embodiment, the frequency of measurements is not limited to two, and three measurements may be conducted with differences in phases of 120°, or four measurements may be conducted with differences in phases of 90°. This makes it possible to provide an increased accuracy of measurement. In addition, the means for binding the balance weight to the torque converter T is not limited to the spot-welding, and any other means such as adhesive-bonding can be used.

What is claimed is:

1. A process for measuring an unbalance of an outer member of a torque converter by assembling an inner member within an outer member and rotating the two members in unison, comprising the steps of:

conducting a plurality of measurements of the torque converter with a phase of coupling between the outer and inner members in an assembled state differentiated by a predetermined angle for the respective measurements;

increasing a rotational speed of the outer and inner members in said assembled state to a measuring rotational speed, then conducting said plurality of measurements at the measuring rotational speed, and thereafter reducing the rotational speed of said outer and inner members from said measuring rotational speed, and processing said measurements thereby calculating unbalance due to the outer member while canceling any unbalance due to the inner member.

2. The process for measuring an unbalance of an outer member of a torque converter according to 1, wherein said measurements are conducted in a condition in which oil is filled within the outer member.

3. A process for correcting an unbalance of a torque converter comprising an inner member and an outer member coupled to the inner member, the process comprising the steps of:

filling oil into the outer member;

conducting a plurality of measurements for an unbalance of the torque converter with a phase of coupling between the outer and inner members differentiated by a predetermined angle for the respective measurements processing and results of said measurements to calculate an unbalance due to the outer member and oil while canceling any unbalance due to the inner member;

cutting a metal tape into a balance weight having a sufficient weight to correct the calculated unbalance and binding said balance weight to an outer periphery of the torque converter at a predetermined location; and discharging said oil from within the outer member.

4. A process for measuring an unbalance of an outer member of a torque converter by assembling an inner member within an outer member and rotating the two members in unison, comprising the steps of:

conducting a plurality of measurements of the torque converter with a phase of coupling between the outer and inner members in an assembled state differentiated by a predetermined angle for the respective measurements;

setting the number of said plurality of measurements and said predetermined angle such that vectors obtained through the measurements for indicating directions and amounts of the unbalance due to said inner member can be canceled out with respect to each other when said vectors are added together, and processing said measurements thereby calculating unbalance due to the outer member while canceling any unbalance due to the inner member.

5. A process for measuring an unbalance of an outer member of a torque converter by assembling an inner member within an outer member and rotating the two members in unison, comprising the steps of:

conducting a plurality of measurements of the torque converter with a phase of coupling between the outer and inner members in an assembled state differentiated by a predetermined angle for the respective measurements and in which oil is filled within the outer member, and processing said measurements thereby calculating unbalance due to the outer member while canceling any unbalance due to the inner member.

* * * * *